United States Patent [19]

Ota

[11] Patent Number: 6,034,966
[45] Date of Patent: Mar. 7, 2000

[54] CONTROL METHOD OF DATA TRANSMISSION FOR THE MULTIPLEXING BUS SYSTEM NETWORK AND WIRELESS NETWORK

[75] Inventor: Takeshi Ota, Nakai-machi, Japan

[73] Assignee: Fuji Xerox Co., Ltd., Tokyo, Japan

[21] Appl. No.: 08/733,601

[22] Filed: Oct. 18, 1996

[30] Foreign Application Priority Data

Oct. 20, 1995 [JP] Japan ................................. 7-273116
Jun. 26, 1996 [JP] Japan ................................. 8-165934

[51] Int. Cl.⁷ ................................................. H04B 7/212
[52] U.S. Cl. ............................................ 370/443; 370/431
[58] Field of Search .................................... 359/118, 121, 359/123, 135, 136; 370/443, 445, 441, 431, 432

[56] References Cited

U.S. PATENT DOCUMENTS

| | | | |
|---|---|---|---|
| 4,498,169 | 2/1985 | Rozmus | 370/443 |
| 4,707,828 | 11/1987 | Yamada | 370/447 |
| 5,144,466 | 9/1992 | Nakamura et al. | . |
| 5,276,703 | 1/1994 | Budin | 370/445 |
| 5,282,257 | 1/1994 | Ota | 359/121 |
| 5,343,314 | 8/1994 | Nakamura | 359/123 |
| 5,510,920 | 4/1996 | Ota | 359/121 |
| 5,668,811 | 9/1997 | Worsley | 370/424 |
| 5,773,345 | 6/1998 | Ota | 438/286 |

FOREIGN PATENT DOCUMENTS 2-162939  6/1990  Japan .
3-270432  12/1991  Japan .
5-14385   1/1993  Japan .

Primary Examiner—Ajit Patel
Assistant Examiner—Ricardo M. Pizarro
Attorney, Agent, or Firm—Oliff & Berridge, PLC

[57] ABSTRACT

An improved transmission control method for use in a network which includes a time division multiplexing channel and a contention control channel. At least one station and a central control unit are connected both to a contention control channel and a time division multiplexing (TDMA) channel. When a station starts a time division multiplexing session, it transmits an access request to the central control unit via the contention control channel. After the central control unit receives the access request, the station which transmitted the access request is included in the order of the time division multiplexing (TDMA). The central control unit repeatedly transmits a transmission permitting token to the station via the TDMA channel in accordance with the order of the time division multiplexing. The station which received the transmission permitting token transmits the data entity, if existing, to either the other station or the central control unit via the second communication channel, and also transmits a transmission terminating token to the central control unit via the second communication channel. When the central control unit receives the transmission terminating token, it transmits the transmission permitting token via the second communication channel to the next station in the order of the time division multiplexing.

12 Claims, 11 Drawing Sheets

SIGNALS ON THE WAVELENGTH $\lambda_2$ ($\lambda_4$)

SIGNALS ON THE WAVELENGTH $\lambda_2 (\lambda_4)$

CONTROL METHOD OF DATA TRANSMISSION FOR THE MULTIPLEXING BUS SYSTEM NETWORK AND WIRELESS NETWORK

BACKGROUND OF THE INVENTION

1. Field of the Invention

This invention relates to a network, such as LAN (Local Area Network), which uses a time division multiplexing control communication channel and a contention control communication channel. This invention relates to, for example, the multiplexing bus system network which includes both a time division multiplexing control bus and a contention control bus and is suitable for the multimedia data transmission, and more particularly relates to a multiplexing bus system network which excludes waste of the time slot on the time division multiplexing bus and improves the channel utilization. This invention also relates to, for example, a wireless network which uses both a wireless communication channel employing the time division multiplexing control method and a wireless communication channel employing contention control method, more particularly relates to a wireless network which excludes waste of the time slot of the time division multiplexing channel and improves the channel utilization.

2. Description of the Related Art

FIG. 13 shows a conventional art disclosed in Japanese Patent Laid-Open No. Hei 3-270432. This figure includes a first bus 101 employing the CSMA/CD (carrier sense multiple access/collision detection), which is a kind of the contention control protocol, a second bus 102 employing the time division multiple access protocol (TDMA). Each station 103 is connected with both buses. A central control unit 104 conducts the time division control. The station 103 transmits an access request to the central control unit 104 via the first bus 101. The central control unit 104 conducts the time division control by sending out a time slot control token onto the second bus 102. This configuration has merit that the time division multiplexing control bus can be used under the multimedia processing environment, which needs to transmit a great deal of sound or image data in real time.

FIG. 14 shows a conventional art that two buses in FIG. 13 are conducted by the wavelength multiplexing. In this figure, wavelengths λ1 and λ2 correspond to the first and second buses, respectively. This conventional art is disclosed in Japanese Patent Laid-Open Hei. 2-162939 (U.S. Pat. No. 5,144,466) or Japanese Patent Laid-Open Hei. 5-14385.

In the conventional art, the time slot of the time division multiplexing control is constant. Therefore, if the station to which the time slot is allotted has no transmission request at the time, waste of the time slot degrades the communication efficiency of the whole system. Further, the conventional art does not describe any control systems for the multicast transmission, which plural stations receive a packet.

SUMMARY OF THE INVENTION

The present invention has been made in view of the above circumstances and has an object to provide the multiplexing bus system network and the wireless network which transmits data efficiently in response to the transmission request at any time. Another object of the invention is to provide the multiplexing bus system network which can conduct multicast transmission. To achieve the objects and in accordance with the purpose of the invention, as embodied and broadly described herein, in a network including, at least one station which is capable of via both of a first communication channel employing a contention control communication protocol and a second communication channel employing a time division multiplexing communication protocol; and time division multiplexing control means which is capable of communicating via both the first communication channel and the second communication channel, and of controlling a data transmission on the second communication channel in accordance with an order of the time division multiplexing, a method for controlling a data transmission of the network, comprising the steps of transmitting an access request from one of the at least one station to the time division multiplexing control means via the first communication channel when the station begins a time division multiplexing session to transmit a data entity to either the other station or the time division multiplexing control means via the second communication channel; including the station which transmitted the access request in the order of the time division multiplexing after the time division multiplexing control means received the access request; repeatedly transmitting a transmission permitting token, which permits the station to use the second communication channel, from the time division multiplexing control means to the station which transmitted the access request, via the second communication channel, in accordance with the order of the time division multiplexing; transmitting the data entity if existing, from the station which received the transmission permitting token to either the other station or the time division multiplexing control means via the second communication channel; transmitting a transmission terminating token, which represents the end of the transmission of the data entity, from the station which received the transmission permitting token to the time division multiplexing control means via the second communication channel; and transmitting the transmission permitting token via the second communication channel, from the time division multiplexing control means to the next station on the order of the time division multiplexing when the time division multiplexing control means receives the transmission terminating token.

In this invention, since the width of the time slot is changed in accordance with the presence or the quantity of the transmitting data, the time slot is not consumed wastefully. Accordingly, the channel utilization improves. The first channel and second channel can be implemented by either the optical buses or the wireless communication channels.

Another aspect of this invention, in a multiplexing bus system network including, a first bus employing a contention control protocol; a second bus employing a time division multiplexing protocol; a plurality of stations connected to both the first bus and the second bus; and a time division multiplexing controller connected to both the first bus and the second bus, for controlling a data transmission on the second bus in accordance with an order of the time division multiplexing, a method for controlling a data transmission of the network, comprising the steps of transmitting an access request from one of the plurality of stations to the time division multiplexing controller via the first bus when the station begins a time division multiplexing session to carry out a multicast transmission, which is a simultaneous transmission of a data entity from the station to the other plural stations via the second bus; including the station which transmitted the access request in the order of the time division multiplexing after the time division multiplexing controller received the access request; repeatedly transmitting a transmission permitting token, which permits the station to use the second bus, from the time division multiplexing controller to the station which transmitted the access request, via the second bus, in accordance with the order of the time division multiplexing; sending out multicast information, which is a data entity having no address, from the station which received the transmission permitting token, onto the second bus; and communicating a control information for carrying out the multicast transmission via the first bus among the station to send out the multicast information and the plural stations to receive the multicast information.

DETAILED DESCRIPTION OF THE PREFERRED EMBODIMENT

In the following, the embodiment of the present invention which is applied to the optical LAN with reference to the drawings.

[Network configuration]

Figure 1:
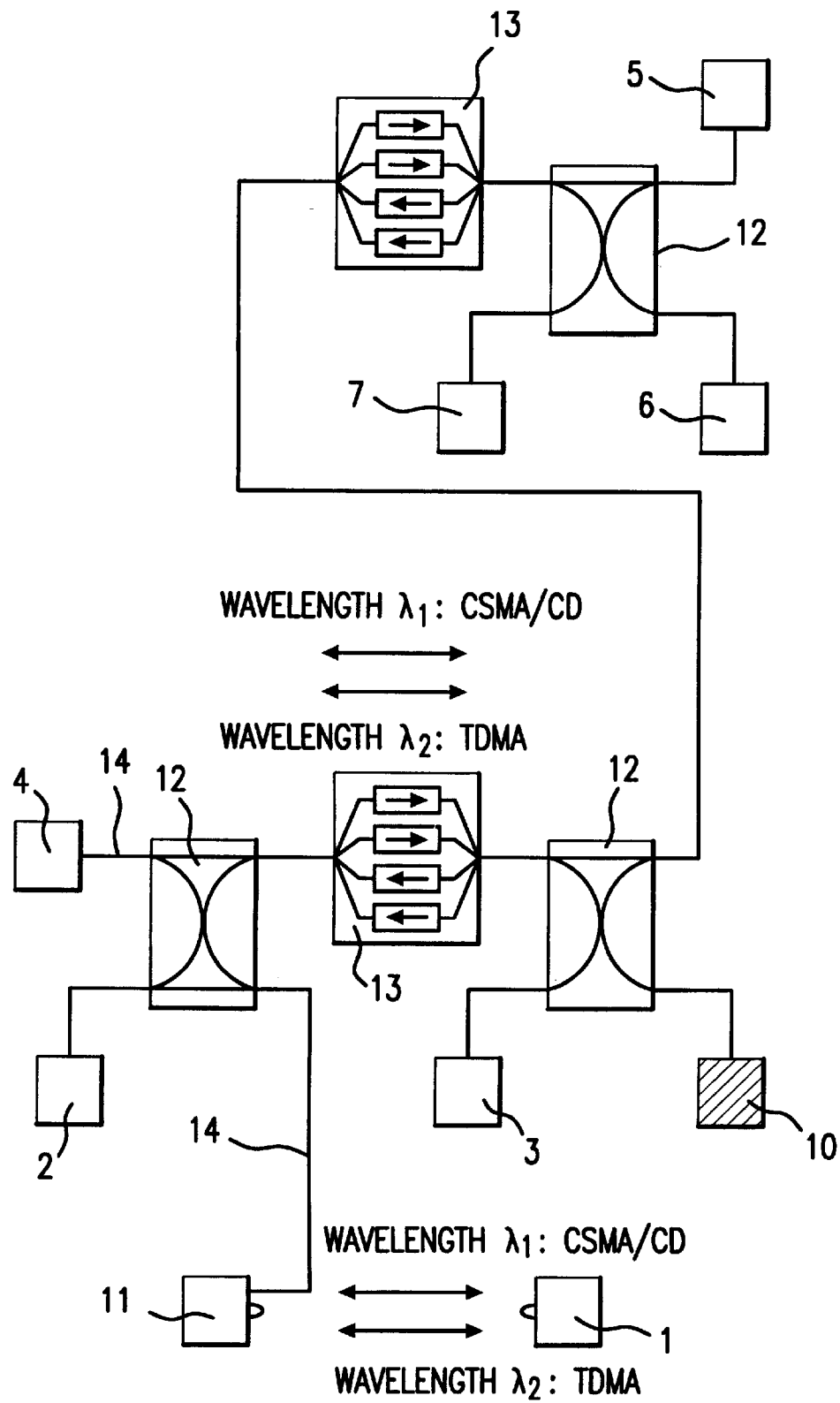
FIG. 1 is a block diagram illustrative of the embodiment that the present invention is applied to the multiplexing bus system network.

FIG. 1 shows an optical network in the embodiment of the present invention. In FIG. 1, the station 1 is connected with the optical fiber network via repeater 11, which interchanges the free space transmission optical signal with the optical fiber transmission optical signal. Stations 2, 3, 4, 5, 6 and 7 are connected with the optical fiber network.

The optical fiber network is consisting of optical fibers 14, a wavelength multiplexed bi-directional optical relay amplifier 13, a interconnectable 4-terminal passive star coupler 12 and a central control unit 10, which controls the time division multiplexing control channel. Two transmission channels are formed in the optical fiber and free space by wavelength multiplexing. Wavelength $\lambda 1$ is allotted to the transmission channel employing the contention control protocol, such as CSMA/CD protocol. Wavelength $\lambda 2$ is allotted to a transmission channel employing the time division multiplexing control (TDMA) protocol. Although this embodiment allots the same wavelength $\lambda 1$ to the contention control channels of the optical fiber and free space, the wavelength of the optical fiber channel can be different from that of the free space channel. In the same way, different wavelengths can be allotted to the TDMA channels of the optical fiber and free space. For instance, wavelengths $\lambda 1$ and $\lambda 3$ are allotted to the contention control transmission channels of optical fiber and free space, respectively. Wavelengths $\lambda 2$ and $\lambda 4$ are allotted to the time division multiplexing control transmission channels of the optical fiber and free space, respectively.

Further, a plurality of TDMA transmission channels can be used. In this case, the TDMA central control unit is provided for each of the TDMA transmission channels.

[Mechanism of the network control]

Figure 2A:
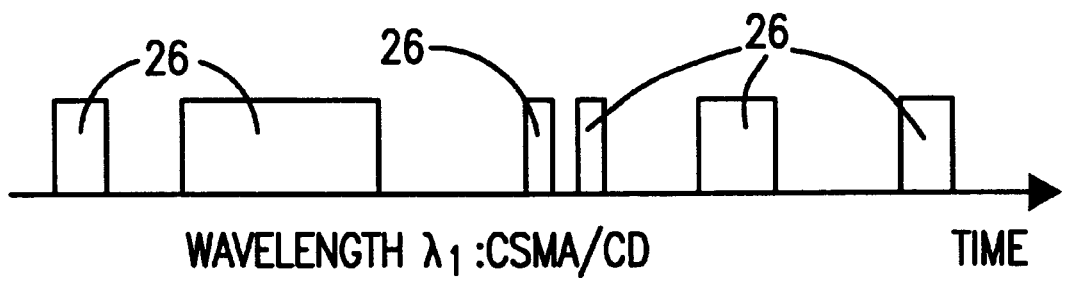
FIG. 2 is a time chart illustrative of the data transmission on the CSMA/CD channel and TDMA channel in the embodiment.
Figure 2B:
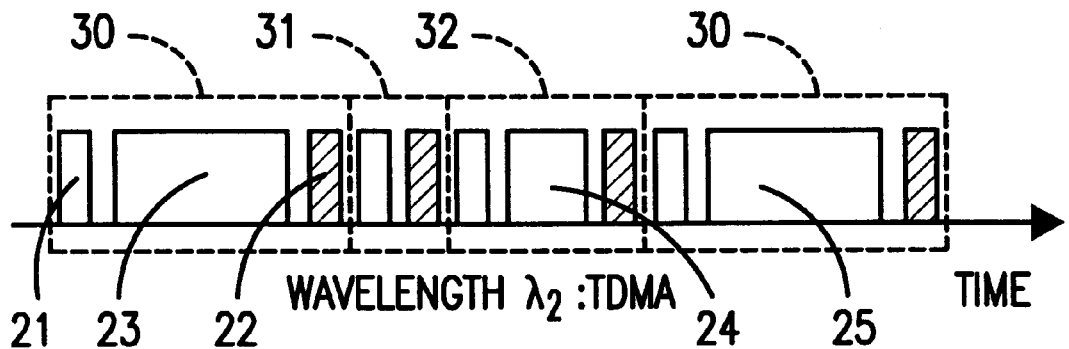

FIGS. 2A and 2B are time charts of the optical communication network in FIG. 1. FIG. 2A shows signals of wavelength $\lambda 1$, that is, signals on the transmission channel employing the CSMA/CD protocol. FIG. 2B shows signals of wavelength $\lambda 2$, that is, signals on the transmission channel employing the TDMA protocol.

In FIG. 2B, each of 30, 31 and 32 shows a time slot. As shown in FIG. 2B, the width of each of the time slots 31, 32 and 33 is not constant. This is the point to distinguish this invention from the conventional art. That is to say, this embodiment adopts variable-width time slots on the transmission channel employing the TDMA protocol. The process to produce variable-width time slots is explained in detail later.

Figure 4A:
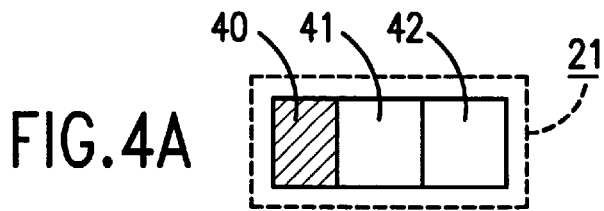
FIGS. 4A through 4F illustrate the structures of the packets in the embodiment.

FIG. 2B further shows a token 21 sent out from the TDMA central control unit 10. The token 21 is called a transmission permitting token. The transmission permitting token 21 includes one medium control address which is an address of the station to be permitted to transmit data. FIG. 4A shows a structure of a packet representing the transmission permitting token 21. The packet of the transmission permitting token 21 includes, at the head of the packet, a header 40 which indicates that the packet is the transmission permitting token, next to the header 40, a medium control address 41 of the station to be permitted to transmit data, and at the end, a medium control address 42 of the TDMA central control unit 10. The addressing system of the medium control addresses can be either the relative address or the absolute address. The following explanation of this embodiment determines the medium addresses by the absolute address.

Figure 4B:
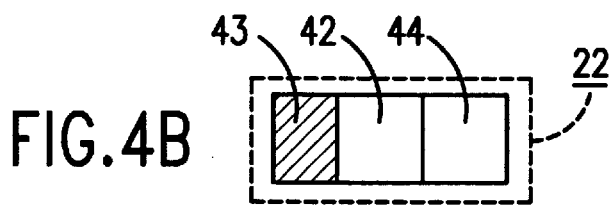

FIG. 2B further includes a transmission terminating token 22 provided for informing the TDMA central control unit 10 of termination of the data transmission when the station which is permitted to transmit data terminates the data transmission. FIG. 4B shows a structure of a packet of the transmission terminating token 22. The packet of the transmission terminating token 22 includes, at the head of the packet, a header 43, which indicates that the packet is the transmission terminating token, next to the header 43, a medium control address 42 of the TDMA central control unit 10, and at the end, a medium address 44 of the station which completes the data transmission.

As shown in FIG. 2B, the time slot 30 includes the transmission permitting token 21, a packet 23 to transmit an entity of information, and the transmission terminating token 22. In FIG. 1, when the TDMA central control unit 10 sends a transmission permitting token 21 to one of the stations, such as the station 2, the station 2 which receives the transmission permitting token 21 sends out the packet 23 addressed to, for instance, the station 5 onto the TDMA channel of wavelength λ2. The station 5 receives the packet 23. The station 2 sends out the transmission terminating token 22 onto the TDMA channel of wavelength λ2 after the transmission of the packet 23 is completed. The TDMA central control unit 10 begins the next process after receiving the transmission terminating token 22.

In FIG. 2B, there is an interval between the packet 23 of the information entity and the transmission terminating token 22. It is not, however, necessary. That is, the transmission terminating token 23 can be sent out as soon as the packet 23 of the information entity is transmitted.

The TDMA central control unit 10 sends the transmission permitting token 21 to, for instance, the station 3. Assuming that the station 3 has no transmission request of the information entity then unexpectedly, then, the station 3 sends out the transmission terminating token 22 soon after receiving the transmission permitting token 21. The TDMA central control unit 10 receives the transmission terminating token 22, and immediately starts the next process.

Next, the transmission permitting token 21 is sent to the station 4. The station 4 sends out the packet 24 to, for instance, the station 6, after receiving the transmission permitting token 21. The station 6 receives the packet 24. The station 4 sends out the transmission terminating token 22 as soon as the transmission of the packet 24 is completed. The time width of the packet 24 may be different from that of the packet 23, because the transmission of the information entity is conducted just for the requested quantity. The above-described process makes the data transmission efficient, and excludes blank intervals in the time slot.

Further, after the TDMA central control unit 10 receives the transmission terminating token 22 from the station 4, it sends out the transmission permitting token 21 to, for instance, the station 5 in the same manner. The station 5 sends out the packet 25 to, for instance, the station 7. The station 5 further sends out the transmission terminating token 22 after the transmission of the packet 25 is completed.

Figure 3:
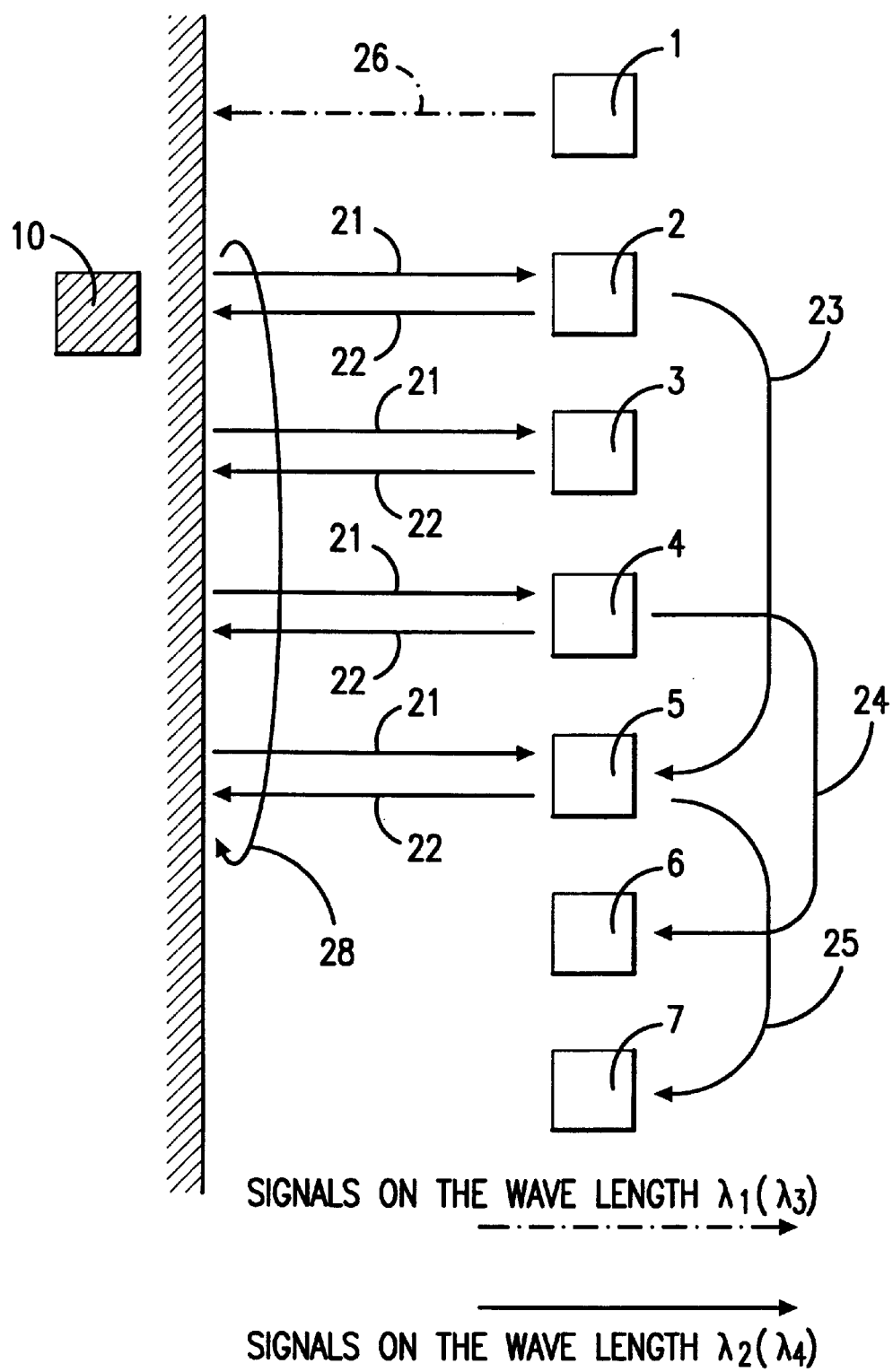
FIG. 3 illustrates the control of the logical ring on the TDMA channel in the embodiment.

The TDMA central control unit 10 sends out the transmission permitting token 21 to the station 2 again, after receiving the transmission terminating token 22 from the station 5. Following to the above-described process, the control is conducted repeatedly (in circulation). FIG. 3 illustrates the concept of the control in circulation.

The above-described control process in circulation is called a logical ring 28. When a new station enters the logical ring 28, the station sends out an access request to the TDMA central control unit 10 via the CDMA/CD transmission channel of the wavelength λ1. In this case, the station which enters the logical ring 28, at first, observes the TDMA transmission channel of the wavelength λ2, and receives an appropriate transmission permitting token to obtain the medium control address 42 of the TDMA central control unit 10. The station, then, sends out the packet addressed to the medium control address 42 to the CSMA/CD transmission channel of the wavelength λ1. FIG. 3 illustrates the concept that the station 1 sends out the packet 26 representing the access request onto the CSMA/CD channel of the wavelength λ1. Entering the logical ring is called beginning a session. A station being in the logical ring 28 is called the station running a session of the time division transmission. While the station is in the logical ring 28 after once it got the transmission permission, the station can receive the transmission permitting token in the constant frequency and is permitted to occupy the line in the predetermined degree.

This embodiment can conduct the above-described control process, because each station has a medium control address of the absolute address type. When the system of the medium control address is the relative addressing system, the same control process can be conducted if the CSMA/CD transmission channel and the TDMA transmission channel share the same medium control address for the same station.

Figure 4E:
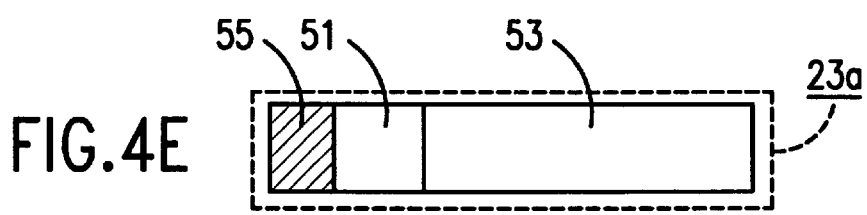
Figure 4F:
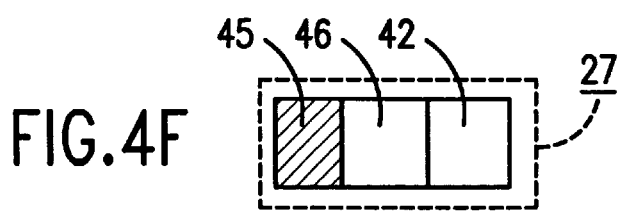
Figure 5:
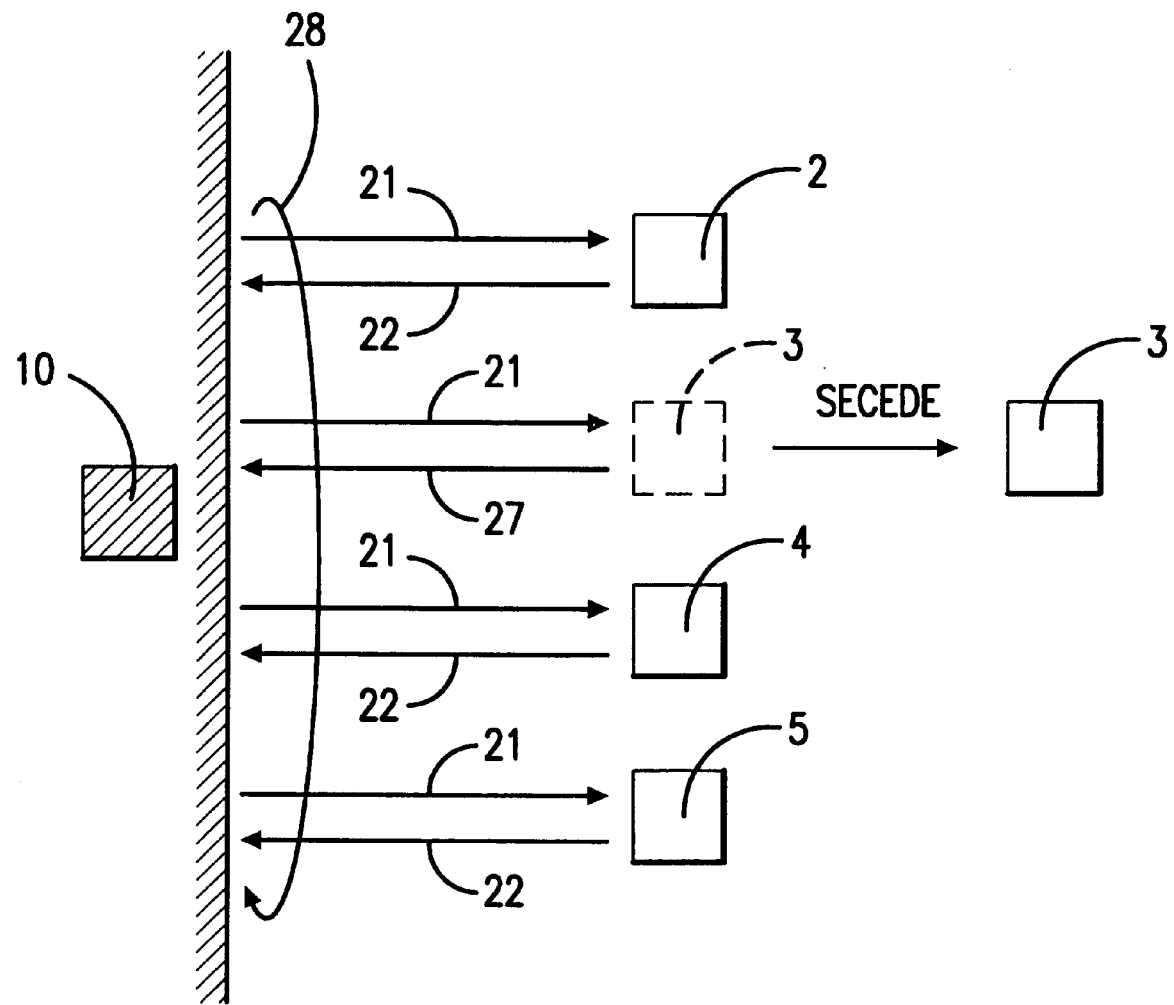
FIG. 5 illustrates the concept of the secession of the station from the logical ring in the embodiment.

When a station want to secede from the logical ring 28, the station receives the transmission permitting token 21 addressed to itself from the TDMA transmission channel of the wavelength λ2, and then sends out a logical ring secession token 27 onto the TDMA central control unit 10. FIG. 4E shows the structure of the logical ring secession token 27. The packet of the logical ring secession token 27 consists of a header 45, which indicates that the packet is the logical ring secession token, a medium control address 46 of the station which secedes from the logical ring, and a medium control address 42 of the TDMA central control unit 10. FIG. 5 illustrates the concept that the station 3 secedes from the logical ring 28. The station 3 secedes from the logical ring 28, which is referred that the station 3 ends the session of the time division transmission.

Figure 4C:
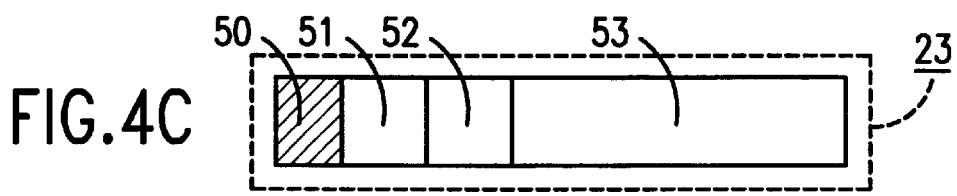
Figure 4D:
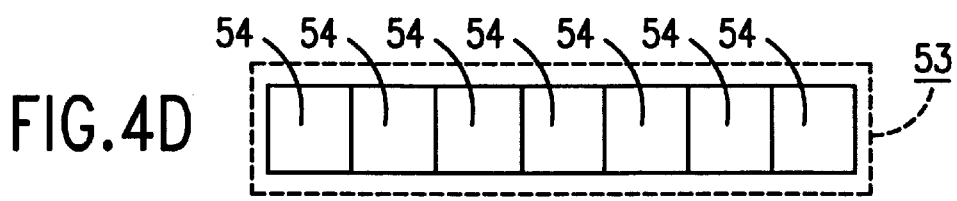

FIG. 4C shows the structure of the packet 23 to transmit the information entity. The packet 23 consists of a header 50, which indicates that the packet is what transmits the information entity, a medium control address 51 of the destination, a medium control address 52 of the sender, and the information entity 53. The information entity includes, for instance, a plurality of the ATM cells 54 (asynchronous communication mode cell) as shown in FIG. 4D. The information entity is not of course limited to the structure shown in FIG. 4D. The ATM cell is switched by the ATM switching device, and is sent out onto the transmission channel in the embodiment via a router. The ATM cells are made in a group as the entity 5, when sent out onto the channel of the embodiment.

[Time out process]

Figure 6:
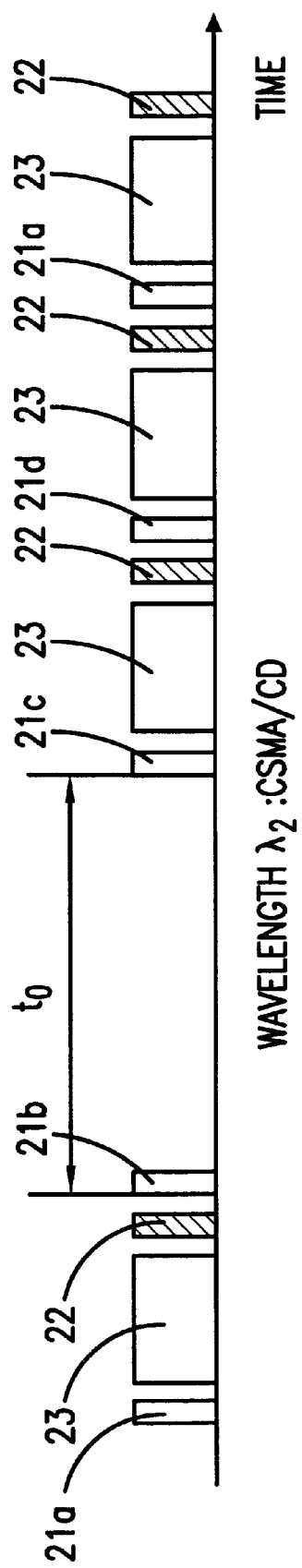
FIG. 6 is a time chart illustrative of the time out process in the embodiment.
Figure 7:
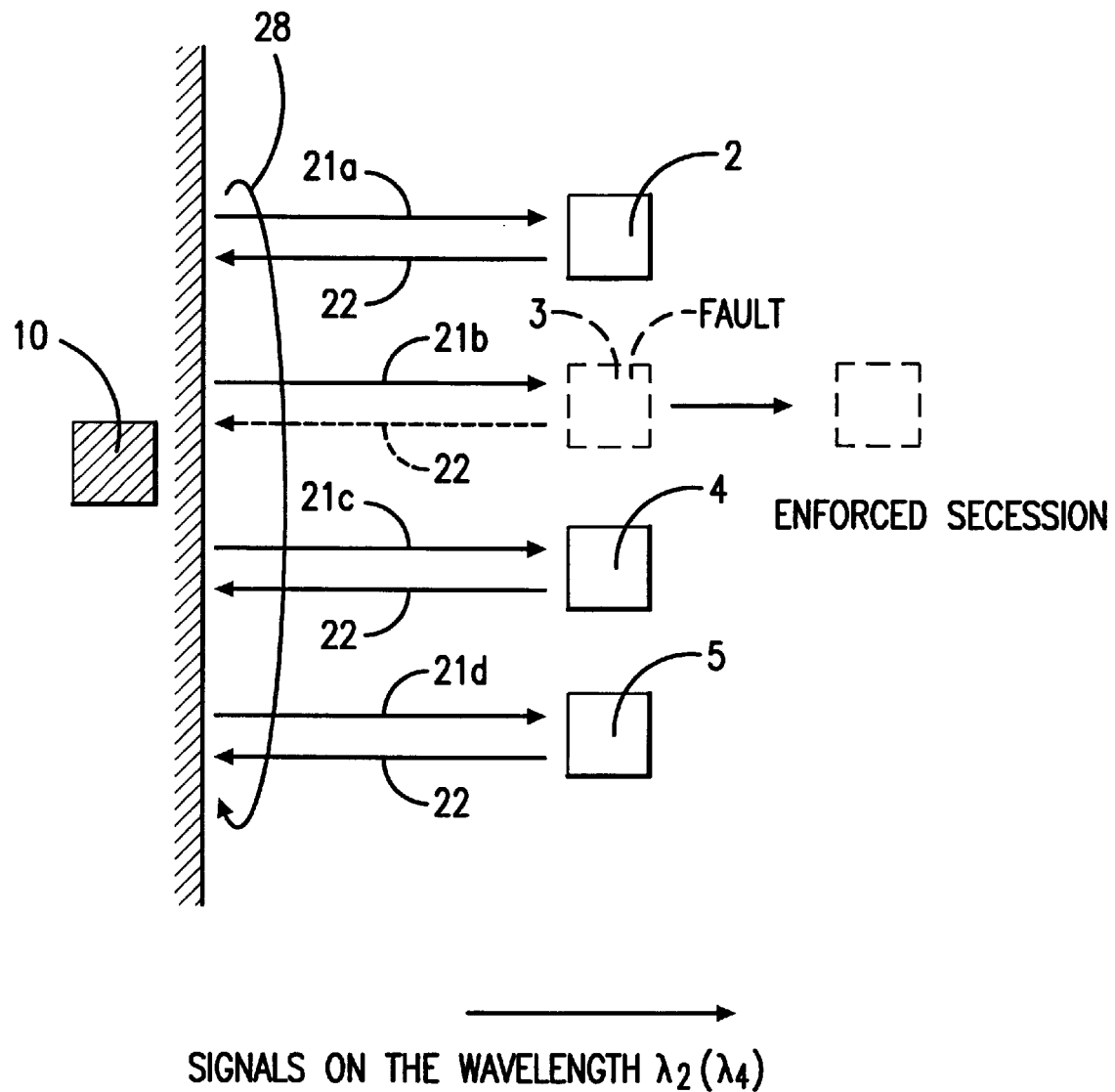
FIG. 7 illustrates the concept of the time out process.

FIG. 6 is a time chart which illustrates the time out process of the TDMA transmission channel of the wavelength λ2. FIG. 7 shows the concept of the time out process. The time out process is conducted when the station which receives the transmission permitting token does not send out the transmission terminating token 22 by some causes. That is to say, the time out process is provided for the breakdown of the station, sudden shutdown of the power, or the fault and the noise of the transmitting line, and so on.

As shown in FIG. 6, if the TDMA central control unit 10 does not receive the transmission terminating token 22 after a constant time period π0 passes from the sending of the transmission permitting token 21 (21b), the TDMA central control unit 10 sends out the next transmission permitting token 21 (21c). FIG. 7 shows the case that failures occur in the station 3. After a constant time period π0 passed without receiving the transmission terminating token 22 to replay to the transmission permitting token 21b, the TDMA central control unit 10 send out the next transmission permitting token 21c (transmission permitting token 21c for the station 4).

After the logical ring 28 make a round, when the turn of the station 3 comes again, the TDMA central control unit 10 sends out the transmission permitting token 21b to the station 3. However, there is no reply again. Accordingly, the TDMA central unit 10 sends out the next transmission permitting token 21c (transmission permitting token for the station 4) after a constant time period π0 passed. When a station does not reply for consecutive predetermined times, the TDMA central control unit 10 eliminates the station from the logical ring 28 by force. That is, the station which does not reply for consecutive predetermined times, for example 5 or 10 times, is determined to be in failure, and the next transmission permitting token addressed to the station is not send out.

[Multicast transmission]

The structure of the packet 23a to transmit the multicast information is shown in FIG. 4E. The multicast packet 23a consists of a header 55 to represent that the packet is the multicast packet, the medium control address 51 of the sender, and the information entity 53. The packet 23a does not include the medium control address of the destination. The multicast represents the simultaneous transmission to the plural stations. The multicast packet represents a packet which is sent to be received by plural stations simultaneously. The information to multicast is mainly the broadcast information such as sound or image (the quantity of the information is big and it is not preferable to transmit repeatedly).

Figure 8:
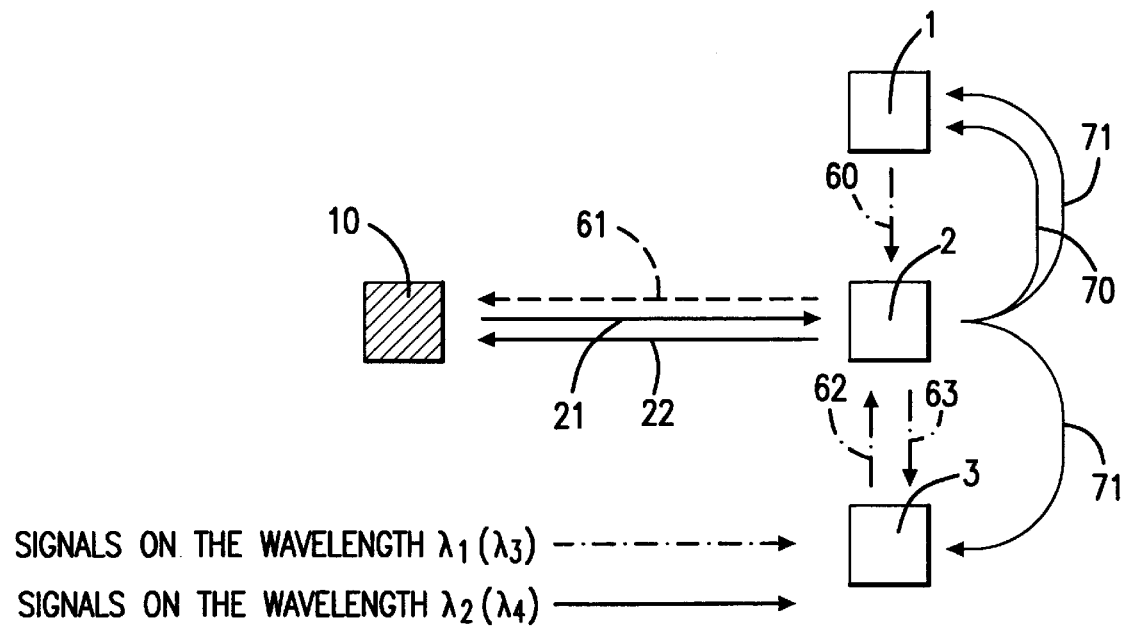
FIG. 8 illustrates the concept of the multicast transmission in the embodiment.
Figure 9:
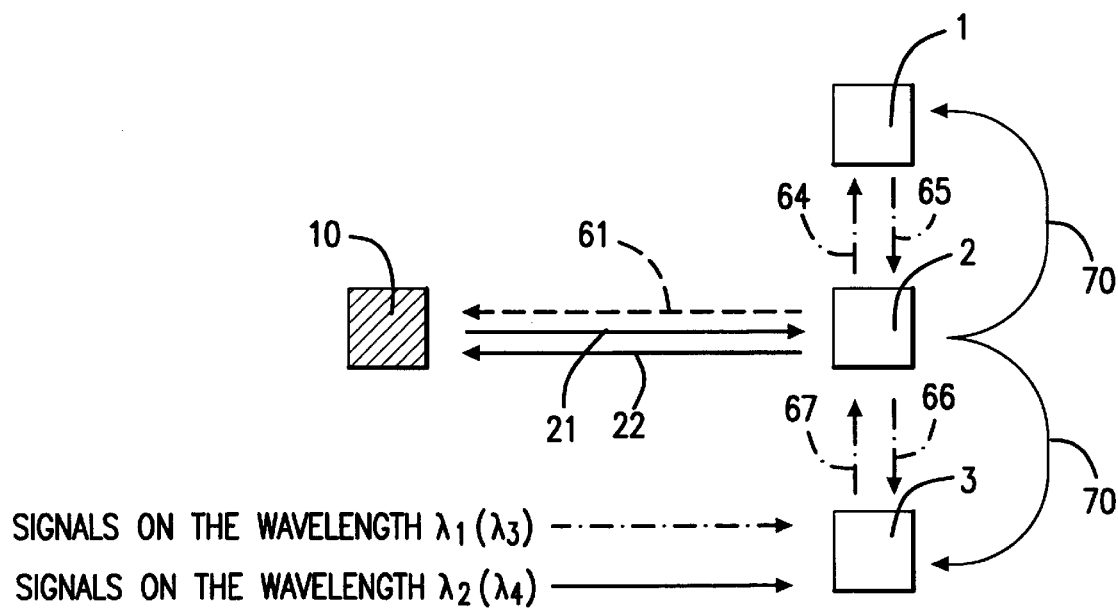
FIG. 9 illustrates the concept of the other multicast transmission in the embodiment.

FIGS. 8 and 9 show the transmission of the multicast information. FIG. 8 shows a case that the station 2 has a source of the multicast information and at first the station 1 requests to access the information, then the station 3 requests to access it. The station 1 sends out an access request packet 60 to the station 2 which has a source of the multicast information via CSMA/CD transmission channel of wavelength λ1. The station 2 sends out the access request packet 61 to the TDMA central control unit 10 via CSMA/CD transmission channel, and then is assigned a transmission line. The station 2 receives the transmission permitting token 21 on the TDMA transmission channel of the wavelength λ2, then send out the multicast packet 70 on the TDMA transmission channel of wavelength λ2. In this phase, only the station 1 can receive the multicast packet 70. In case that a new station 3 wants to receive the multicast information of the station 2, the station 3 send out the access request packet 62 to the station 2 which has the source of multicast information via CSMA/CD channel of the wavelength λ1. The station 2 which has the source of multicast information returns the reply packet 63 which informs that the multicast packet has already been sent to the station 3 via CSMA/CD transmission channel of the wavelength λ1. The station 3 starts to receive the multicast packet 71 after it receives the reply packet 63. The multicast packet 71 is received by both the station 1 and the station 3. Instead, it is also possible that the station 3 watches the TDMA transmission channel of the wavelength λ2 and detects the transmission of the required information from the station 2, then picks up the multicast packet 71.

Further, as shown in FIG. 9, it is possible that at first a plurality of the receiving stations and the station which has the multicast information carry out the negotiation processing via the CSMA/CD transmission channel of the wavelength λ1, then the multicast is started using the method determined by the negotiation processing. Prior to the start of the multicast, the station 2 and the station 1 negotiate by the packet 64 and the packet 65, and the station 2 and the station 3 negotiate by the packet 66 and the packet 67. After the completion of the negotiation, the station 2 sends out the access request packet 61 to the TDMA central control unit 10 via the CDMA/CD transmission channel, and is assigned a transmission line. The station 2 receives the transmission permitting token 21 on the TDMA transmission channel of the wavelength λ2 and then sends out the multicast packet 70 on the TDMA transmission channel of the wavelength λ2. The station 1 and the station 3 receive the multicast packet 70.

[Application for the wireless network]

Figure 10:
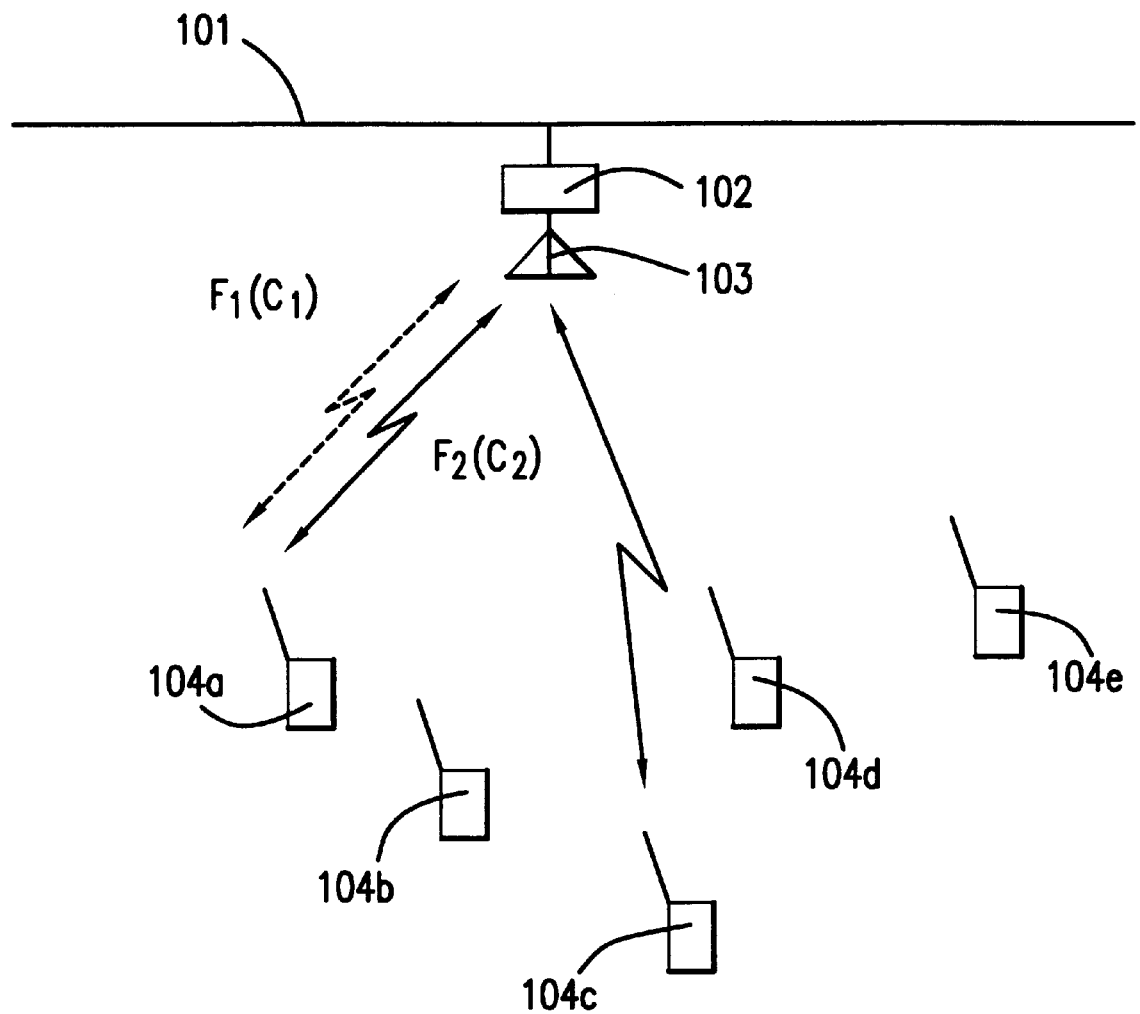
FIG. 10 is a block diagram illustrative of the embodiment to which the present invention is applied to the wireless LAN.
Figure 11:
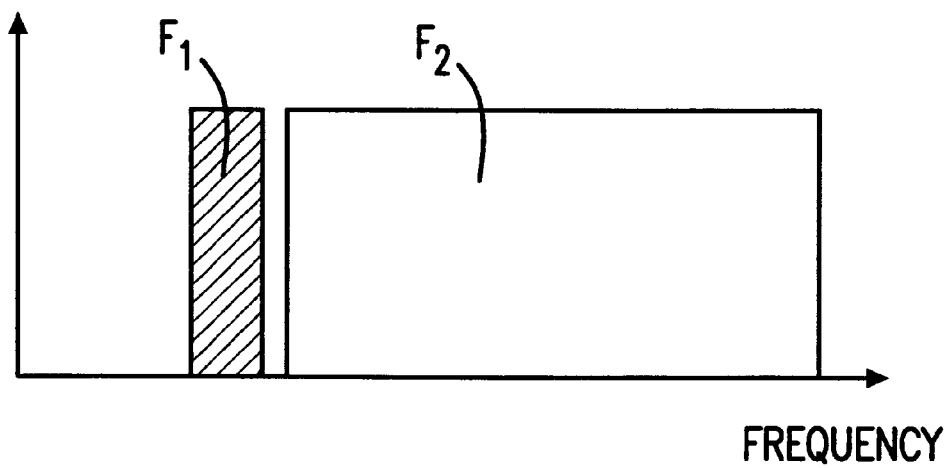
FIG. 11 illustrates the spectrum representing the relation between the contention control transmission channel (frequency F1) and time division multiplexing system transmission channel (frequency F2) in the embodiment of FIG. 10.

In the above, an example of the network system using the optical fiber and the free space light is explained, but it is also possible to apply the above-described transmission process to the wireless network using the radio wave. FIG. 10 shows a block diagram illustrating the embodiment when the above-described transmission process is applied to the wireless LAN. In FIG. 10, the wired network 101 is connected to the wireless base station 102. The wireless base station 102 communicates the mobile stations 104a through 104e via antenna 103. The wavelength λ1 and the wavelength λ2 in the FIG. 1 correspond to the frequency F1 and the frequency F2 in FIG. 10, respectively. But the bandwidths of the frequencies F1 and F2 are not the same. As shown in FIG. 11, the bandwidth of the frequency F1 is set narrower than that of the frequency F2. The transmission protocol of the frequency F1 is not CSMA/CD but the public known aloha method or slotted aloha method. Because it is difficult (or almost impossible) to detect the collision under the communication using the radio wave, the protocol of the aloha method system which is a contention control protocol and does not need to detect the collision is used. The transmission protocol of the frequency F2 is TDMA method.

In the embodiment shown in FIGS. 10 and 11, the bandwidth of the frequency F1 is set narrower to target to improve the whole transmission line efficiency by using the frequency F1 for the access control exclusively. That is to say, it is known that the transmission line efficiency in the protocol of the aloha method system which does not detect collision decreases to one over some than that of the CSMA/CD method. Therefore, the data entity is transmitted via the transmission channel of the time division multiplexing control method which has originally high transmission line efficiency to improve the total transmission line efficiency.

By the configuration of the FIGS. 10 and 11, the unnecessary consumption of the time slot in the wireless LAN using the radio wave can be avoided by using the same control process as that of the configuration shown in FIGS. 2 through 4. The base station 102 in FIG. 10 corresponds to the TDMA central control unit 10 in FIG. 1. The group of the mobile stations 104a through 104e correspond to the group of the stations 1 through 7 in FIG. 1. It is also possible that the mobile stations 104a through 104e send out the data entity to the base station 102 via the time division control transmission channel. That is to say, the configuration shown in FIG. 10, which uses the radio wave, is different from the configuration shown in FIG. 1, because it has no transparency between the wired network and wireless network in the physical layer. Therefore, in the configuration shown in FIG. 10, when the mobile stations 104a through 104e transmit data to the server (without drawing) connected to the wired network 101 via wired network 101, the data must be transmitted via the base station 102. Accordingly, it is important that the mobile stations 104a through 104e can send out the data entity to the base station 102 via the time division control transmission channel. In the configuration of FIG. 1, of course, there is no reason to prohibit the station 1 from the communicating with the TDMA central control unit 10 via channel of wavelength λ1. In the configuration of FIG. 10, however, the communication between the mobile stations 104a through 104e and the base station 102 is particularly important.

Figure 12:
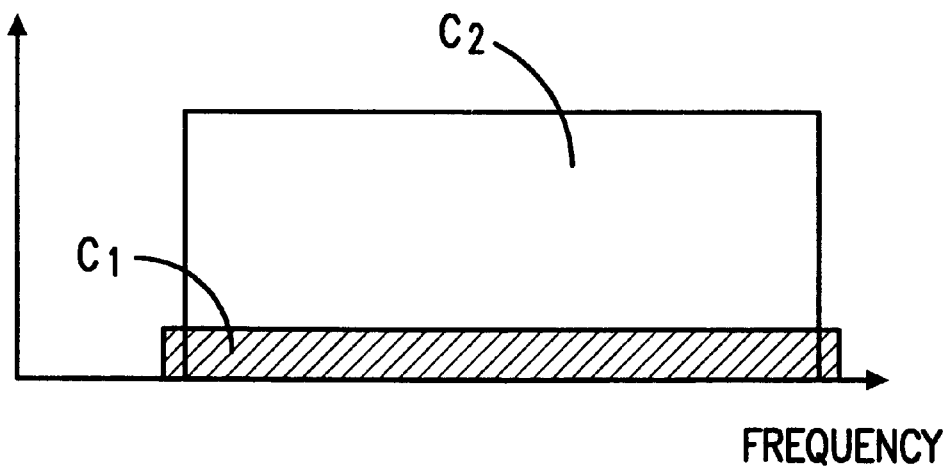
FIG. 12 illustrates the spectrum representing the other relation between the contention control transmission channel (number of codes: C1) and time division multiplexing system transmission channel (number of codes: C2) in the modification example of the embodiment of FIG. 10.
Figure 13:
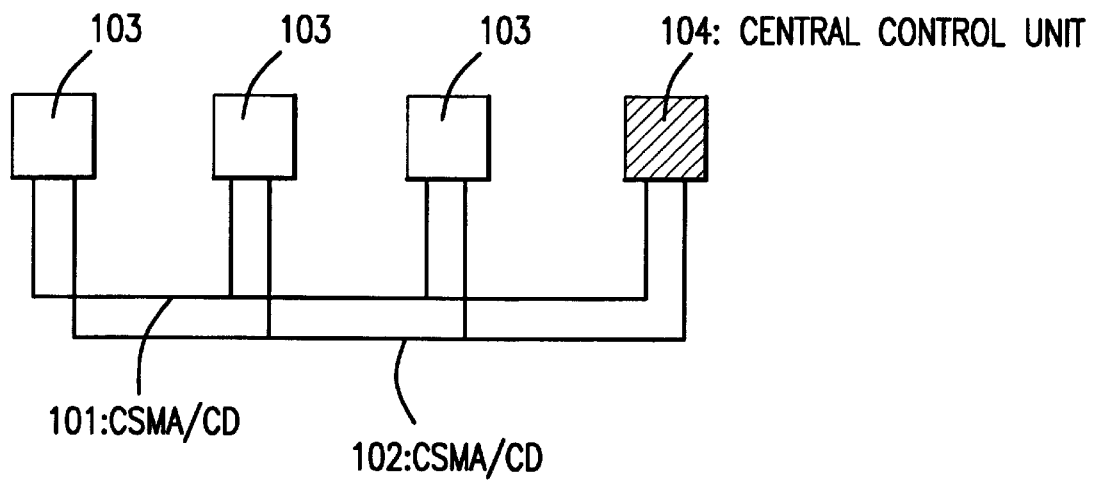
FIG. 13 illustrates the conventional art.
Figure 14:
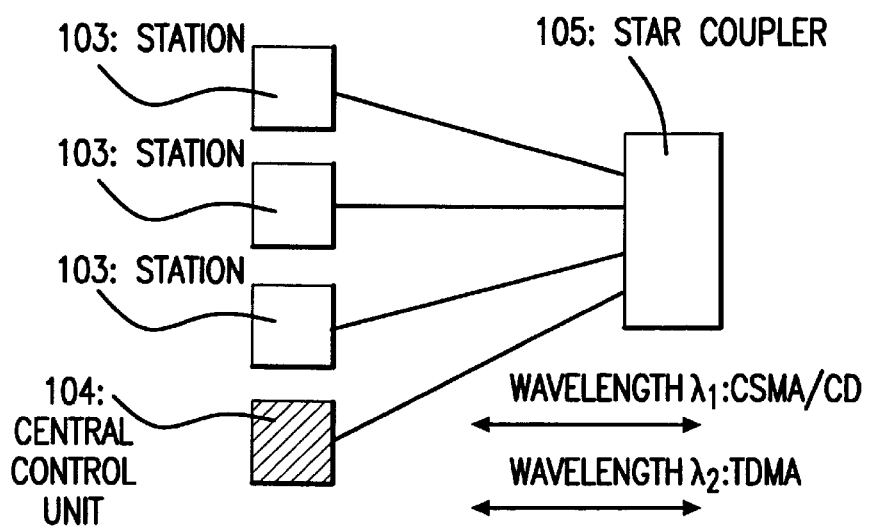
FIG. 14 illustrates the conventional art.

In FIG. 10, the code division multiple access method (CDMA), which is one of the public known spread spectrum method, can be used to form the two transmission channels. In this case, as shown in FIG. 12, it is preferable that the contention control protocol channel uses the high diffusion coefficient code, and the time division multiplexing channel uses the low diffusion coefficient code. It is also possible to set the diffusion coefficient of the time division multiplexing channel for 1, that is, not to conduct the spread spectrum. That is to say, only the contention control channel which is responsible for the access control employs the spread spectrum system, and the time division multiplexing channel employs so-called narrow bandwidth transmission. Note that the narrow bandwidth transmission represents that the diffusion coefficient of the spread spectrum is 1, and does not represent the absolute width of the transmission bandwidth.

As described above, in this invention, the station which conducts the time division multiplexing session sends out the transmission terminating token to the time division multiplexing control unit after the transmission of the data entity or immediately if there is no data entity. In response to the token, the time division control unit sends out the transmission permitting token to the next station. Therefore, the time slot of the data time division multiplexing system can be changed in accordance with the quantity of the transmission data, and wasteful consumption of the time slot is avoided. Consequently, the channel utilization improves. Further, after the stations transmit the data to start the multicast transmission each other via the contention control bus, they conduct the multicast transmission via the time division multiplexing bus.

Further, this invention is also effective when this invention is applied to the wireless network.

What is claimed is:

1. In a wireless network including 1) at least one station which is capable of communicating via both a first communication channel employing a spread spectrum using a first diffusion code and a contention control communication protocol and a second communication channel employing a time division multiplexing communication protocol, and 2) time division multiplexing control means which employs spread spectrum using a second diffusion code and is capable of communicating via both said first communication channel and said second communication channel, and of controlling a data transmission on said second communication channel in accordance with an order of a time division multiplexing, a method for controlling a data transmission of the network, comprising the steps of:

transmitting an access request from a first station of said at least one station to said time division multiplexing control means via said first communication channel employing spread spectrum using a first diffusion code when the first station begins a time division multiplexing session to transmit at least one data entity to either an other station or said time division multiplexing control means which employs spread spectrum using a second diffusion code via said second communication channel;

including the first station which transmitted the access request in the order of the time division multiplexing after said time division multiplexing control means received the access request;

repeatedly transmitting a transmission permitting token, which permits the first station to use said second communication channel, from said time division multiplexing control means to the first station which transmitted the access request, via said second communication channel, in accordance with the order of the time division multiplexing;

transmitting the at least one data entity if existing, from the first station which received the transmission permitting token to either the other station or said time division multiplexing control means via said second communication channel;

transmitting a transmission terminating token for every at least one data entity, which represents an end of the transmission of the at least one data entity, from the first station which received the transmission permitting token to said time division multiplexing control means via said second communication channel; and transmitting the transmission permitting token via said second communication channel, from said time division multiplexing control means to a second station in the order of the time division multiplexing when said time division multiplexing control means receives the transmission terminating token.

2. In a wireless multiplexing bus system network comprising 1) a first bus employing a spread spectrum using a first diffusion code and a contention control protocol, 2) a second bus employing a time division multiplexing protocol, 3) at least one station connected to both said first bus and said second bus, and 4) a time division multiplexing controller which is connected to both said first bus and said second bus, and employs spread spectrum using a second diffusion code and is capable of controlling a data transmission on said second bus in accordance with an order of a time division multiplexing, a method for controlling a data transmission of the network, comprising the steps of:

transmitting an access request from a first station of said at least one station to said time division multiplexing controller via said first bus employing a spread spectrum using a first diffusion code when the first station begins a time division multiplexing session to transmit at least one data entity to either an other station or said time division multiplexing controller which employs spread spectrum using a second diffusion code via said second bus;

including the first station which transmitted the access request in the order of the time division multiplexing after said time division multiplexing controller received the access request;

repeatedly transmitting a transmission permitting token, which permits the first station to use said second bus, from said time division multiplexing controller to the first station which transmitted the access request, via said second bus, in accordance with the order of the time division multiplexing;

transmitting the at least one data entity if existing, from the first station which received the transmission permitting token to either the other station or said time division multiplexing controller via said second bus;

transmitting a transmission terminating token for every at least one data entity, which represents an end of the transmission of the at least one data entity, from the first station which received the transmission permitting token to said time division multiplexing controller via said second bus; and transmitting the transmission permitting token via said second bus, from said time division multiplexing controller to a second station in the order of the time division multiplexing when said time division multiplexing controller receives the transmission terminating token.

3. The method of claim 2, further comprising the steps of transmitting a session end token, which represents the end of the time division multiplexing session, from the first station running the time division multiplexing session to said time division multiplexing controller via said second bus when the first station ends the time division multiplexing session; and removing said first station which transmitted the session end token from the order of the time division multiplexing, after said time division multiplexing controller received the session end token.

4. The method of claim 2, further comprising the step of:

transmitting the transmission permitting token via said second bus, from said time division multiplexing controller to the second station in the order of the time division multiplexing, when said time division multiplexing controller does not receive the transmission terminating token from the first station to which the transmission permitting token was previously transmitted, after a predetermined time period passed.

5. In a multiplexing bus system network comprising 1) a first bus employing a contention control protocol, 2) a second bus employing a time division multiplexing protocol, 3) a plurality of stations connected to both said first bus and said second bus, and 4) a time division multiplexing controller connected to both said first bus and said second bus, for controlling a data transmission on said second bus in accordance with an order of a time division multiplexing, a method for controlling a data transmission of the network, comprising the steps of:

transmitting an access request from a first station of the plurality of stations to said time division multiplexing controller via said first bus when the first station begins a time division multiplexing session to carry out a multicast transmission, which is a simultaneous transmission of a data entity from the first station to other stations among the plurality of stations via said second bus;

including the first station which transmitted the access request in the order of the time division multiplexing after said time division multiplexing controller received the access request;

repeatedly transmitting a transmission permitting token, which permits the first station to use said second bus, from said time division multiplexing controller to the first station which transmitted the access request, via said second bus, in accordance with the order of the time division multiplexing;

sending out a multicast information, which is a data entity having no address, from the first station which received the transmission permitting token, onto said second bus; and communicating a control information for carrying out the multicast transmission via said first bus among the first station to send out the multicast information and the other stations to receive the multicast information.

6. The method of claim 5, wherein:

said step of communicating the control information includes a substep of transmitting a request for the multicast information as the control information from the other stations which are to receive the multicast information to the first station which is to send out the multicast information via the first bus; and said step of transmitting the access request is carried out when the first station receives the request of the multicast information.

7. The method of claim 5, wherein:

said step of communicating the control information includes substeps of transmitting a request for the multicast information as the control information from the other stations which are to receive the multicast information to the first station which is to send out the multicast information via the first bus, detecting whether or not the multicast information has already been sent out onto the second bus when the first station receives the request of the multicast information, and transmitting, if the multicast information has already been sent out, the control information indicating that the multicast information has already been sent out from the first station to the other stations.

8. In a wireless network including 1) at least one child station which is capable of communicating via both a first communication channel employing spread spectrum using a first frequency and a contention control communication protocol and a second communication channel which employs spread spectrum using a second frequency and a time division multiplexing communication protocol, and 2) a base station which is capable of communicating via both said first communication channel and said second communication channel, and of controlling a transmission on said second communication channel in accordance with an order of a time division multiplexing, a method for controlling a data transmission of the network, comprising the steps of:

transmitting an access request from a first child station of said at least one child station to said base station via said first communication channel employing spread spectrum using a first frequency when the first child station begins a time division multiplexing session to transmit at least one data entity to either an other child station or the base station via said second communication channel which employs spread spectrum using a second frequency;

including the first child station which transmitted the access request in the order of the time division multiplexing after said base station received the access request;

repeatedly transmitting a transmission permitting token, which permits the first child station to use said second communication channel, from said base station to the first child station which transmitted the access request, via said second communication channel, in accordance with the order of the time division multiplexing;

transmitting the at least one data entity if existing, from the first child station which received the transmission permitting token, to either the other child station or said base station via said second communication channel;

transmitting a transmission terminating token for every at least one data entity, which represents an end of the transmission of the at least one data entity, from the first child station which received the transmission permitting token to said base station via said second communication channel; and transmitting the transmission permitting token via said second communication channel, from said base station to a second child station in the order of the time division multiplexing when said base station receives the transmission terminating token.

9. In a wireless network comprising 1) at least one child station which is capable of communicating via both a first communication channel which employs spread spectrum using a first diffusion code and a contention control communication protocol, and a second communication channel which employs spread spectrum using a second diffusion code and a time division multiplexing communication protocol, and 2) a base station which is capable of communicating via both said first communication channel and said second communication channel, and of controlling transmission on said second communication channel in accordance with an order of a time division multiplexing, a method for controlling a data transmission of the network, comprising the steps of:

transmitting an access request from a first child station of said at least one child station to said base station via said first communication channel which employs spread spectrum using a first diffusion code when the first child station begins a time division multiplexing session to transmit a data entity to either another child station or the base station via said second communication channel which employs spread spectrum using a second diffusion code;

including the first child station which transmitted the access request in the order of the time division multiplexing after said base station received the access request;

repeatedly transmitting a transmission permitting token, which permits the first child station to use said second communication channel, from said base station to the first child station which transmitted the access request, via said second communication channel, in accordance with the order of the time division multiplexing;

transmitting the data entity if existing, from the first child station which received the transmission permitting token, to either the other child station or said base station via said second communication channel;

transmitting a transmission terminating token, which represents an end of the transmission of the data entity, from the first child station which received the transmission permitting token to said base station via said second communication channel; and transmitting the transmission permitting token via said second communication channel, from said base station to a second child station in the order of the time division multiplexing when said base station receives the transmission terminating token.

10. A method for controlling transmissions of stations which communicate via both a first channel employing spread spectrum using a first diffusion code and a contention control protocol and a second channel employing spread spectrum using a second diffusion code and a time division multiplexing protocol, comprising:

transmitting an access request from a first station to a time division multiplexing controller via the first channel employing spread spectrum using a first diffusion code;

including the first station in an order of a time division multiplexing in response to the access request;

transmitting a transmission permitting token via the second channel employing spread spectrum using a second diffusion code from the time division multiplexing controller to the first station which permits the first station to use the second channel;

transmitting communication signals representing data entities from the first station to an other station or to the time division multiplexing controller via the second channel; and transmitting a transmission terminating token for every data entity from the first station to the time division multiplexing controller via the second channel, the transmission terminating token representing an end of the communication signals.

11. The method according to claim 10, further comprising:

transmitting a transmission terminating token from the first station to the time division multiplexing controller via the second channel when there is no data entity transmitted.

12. A method for controlling transmissions of stations which communicate via both a first channel employing spread spectrum using a first diffusion code and a contention control protocol and a second channel employing spread spectrum using a second diffusion code and a time division multiplexing protocol, comprising:

transmitting an access request from a first station to a time division multiplexing controller via a first channel employing spread spectrum using a first diffusion code;

including the first station in an order of a time division multiplexing in response to the access request;

transmitting a transmission permitting token via the second channel employing spread spectrum using a second diffusion code from the time division multiplexing controller to the first station which allocates a time slot for the first station to use on the second channel;

transmitting communication signals from the first station to an other station or to the time division multiplexing controller via the second channel; and transmitting a transmission terminating token for every time slot from the first station to the time division multiplexing controller via the second channel, the transmission terminating token representing an end of the time slot.

* * * * *